(12) United States Patent
Schlam et al.

(10) Patent No.: US 11,714,316 B2
(45) Date of Patent: Aug. 1, 2023

(54) HIGHLY REFLECTIVE ELECTROSTATIC SHUTTER DISPLAY

(71) Applicant: New Visual Media Group, L.L.C., Eatontown, NJ (US)

(72) Inventors: Elliott Schlam, Wayside, NJ (US); Joshua S. Finch, Howell, NJ (US); Jeffrey P. Koskulics, South Amboy, NJ (US)

(73) Assignee: New Visual Media Group, L.L.C., Eatontown, NJ (US)

( * ) Notice: Subject to any disclaimer, the term of this patent is extended or adjusted under 35 U.S.C. 154(b) by 0 days.

(21) Appl. No.: 15/710,063

(22) Filed: Sep. 20, 2017

(65) Prior Publication Data

US 2019/0086731 A1    Mar. 21, 2019

(51) Int. Cl.
*G06F 3/14* (2006.01)
*G02F 1/13357* (2006.01)
(Continued)

(52) U.S. Cl.
CPC .... *G02F 1/133615* (2013.01); *G02F 1/13473* (2013.01); *G06F 3/14* (2013.01);
(Continued)

(58) Field of Classification Search
CPC ............ G06F 3/14; G06F 3/1423–147; G06F 1/1647; G09G 2300/023; G09G 2300/026;
(Continued)

(56) References Cited

U.S. PATENT DOCUMENTS 3,236,290 A    2/1966  Lueder
3,897,997 A    8/1975  Kalt
(Continued)

FOREIGN PATENT DOCUMENTS

EP    1241507 A2    9/2002
JP    10-249278 A   9/1998
(Continued)

OTHER PUBLICATIONS

International Search Report for PCT/US2018/000371, dated Feb. 25, 2019.

*Primary Examiner* — Roberto W Flores
(74) *Attorney, Agent, or Firm* — Lerner David LLP

(57) ABSTRACT

A reflective display tile can be used in connection with a static or video display. The tile includes a transparent substrate having a front surface, a rear surface, and a peripheral edge surrounding the front and rear surfaces, an electrostatic shutter array disposed at the front surface of said substrate, a reflective medium disposed at the rear surface of the substrate, and drive electronics disposed rearward of the reflective medium. The shutter array and drive electronics are configured so that the tile is tileable and can be abutted at any of its peripheral edges against identical tiles to form a display with substantially no perceived optical interface between adjacent tiles. Another embodiment includes an opaque substrate such as a circuit board. A further embodiment has a polymeric film coated on one side with a metal film and on another side with ink or blackening material.

17 Claims, 3 Drawing Sheets

(51) Int. Cl.
*G02F 1/1347* (2006.01)
*G09F 9/37* (2006.01)
*G09G 3/34* (2006.01)
*G09F 13/16* (2006.01)
*G02F 1/137* (2006.01)
*G02F 1/1333* (2006.01)
*G02F 1/1345* (2006.01)
*G02F 1/1335* (2006.01)

(52) U.S. Cl.
CPC ............ *G06F 3/1446* (2013.01); *G09F 9/372* (2013.01); *G09F 13/16* (2013.01); *G09G 3/3433* (2013.01); *G02F 1/13336* (2013.01); *G02F 1/13456* (2021.01); *G02F 1/13718* (2013.01); *G02F 1/133616* (2021.01); *G02F 2203/02* (2013.01); *G09G 2300/026* (2013.01)

(58) Field of Classification Search
CPC .......... G09G 2360/04; G09G 2360/06; G09G 2360/122; G09G 2356/00; G02F 1/13336; G02F 1/133616
USPC .................................................. 345/1.1–2.3
See application file for complete search history.

(56) References Cited

U.S. PATENT DOCUMENTS

| | | | |
|---|---|---|---|
| 3,989,357 A | 11/1976 | Kalt | |
| 4,082,426 A | 4/1978 | Brown | |
| 4,094,590 A | 6/1978 | Kalt | |
| 4,105,294 A | 8/1978 | Peck | |
| 4,208,103 A | 6/1980 | Kalt et al. | |
| 4,248,501 A | 2/1981 | Simpson | |
| 4,266,339 A | 5/1981 | Kalt | |
| 4,336,536 A | 6/1982 | Kalt et al. | |
| 4,383,255 A | 5/1983 | Srandjean et al. | |
| 4,468,663 A | 8/1984 | Kalt | |
| 4,488,784 A | 12/1984 | Kalt et al. | |
| 4,695,837 A | 9/1987 | Kalt | |
| 4,747,670 A | 5/1988 | Devio et al. | |
| 4,788,089 A | 11/1988 | Skipper | |
| 4,915,486 A | 4/1990 | Hansen | |
| 4,978,952 A | 12/1990 | Irwin | |
| 5,231,559 A | 7/1993 | Kalt et al. | |
| 5,519,565 A | 5/1996 | Kalt et al. | |
| 5,554,434 A | 9/1996 | Park et al. | |
| 5,629,790 A | 5/1997 | Neukermans et al. | |
| 5,638,084 A | 6/1997 | Kalt | |
| 6,057,814 A | 5/2000 | Kalt | |
| 6,075,639 A | 6/2000 | Kino et al. | |
| 6,081,304 A | 6/2000 | Kuriyama et al. | |
| 6,229,501 B1 | 5/2001 | Roth et al. | |
| 6,317,108 B1 | 11/2001 | Kalt | |
| 6,557,279 B2 | 5/2003 | Araki et al. | |
| 6,559,827 B1 | 5/2003 | Mangerson | |
| 6,590,626 B1 | 7/2003 | Suzuki et al. | |
| 6,692,646 B2 | 2/2004 | Kalt et al. | |
| 6,771,237 B1 | 8/2004 | Kalt | |
| 6,897,786 B1 | 5/2005 | Kalt et al. | |
| 6,972,888 B2 | 12/2005 | Poll et al. | |
| 7,085,609 B2 | 8/2006 | Bechtel et al. | |
| 7,645,977 B2 | 1/2010 | Schlam et al. | |
| 7,705,826 B2 | 4/2010 | Kalt et al. | |
| 8,035,075 B2 | 10/2011 | Schlam et al. | |
| 8,134,112 B2 | 3/2012 | Schlam et al. | |
| 8,736,938 B1 | 5/2014 | Schlam et al. | |
| 2002/0054033 A1 | 5/2002 | Nakamura et al. | |
| 2002/0144831 A1 | 10/2002 | Kalt | |
| 2004/0001033 A1* | 1/2004 | Goodwin-Johansson | G02B 26/02 345/31 |
| 2005/0078104 A1 | 4/2005 | Matthies et al. | |
| 2006/0169980 A1* | 8/2006 | Morita | G02F 1/163 257/59 |
| 2009/0225396 A1* | 9/2009 | Sampsell | G02B 26/001 359/292 |
| 2010/0172007 A1 | 7/2010 | Schlam et al. | |
| 2011/0227080 A1* | 9/2011 | Roh | G02B 26/005 257/59 |
| 2013/0088856 A1 | 4/2013 | Kim et al. | |
| 2015/0023051 A1* | 1/2015 | Jepsen | G09G 3/20 362/559 |
| 2015/0155340 A1 | 6/2015 | Lim et al. | |
| 2015/0300812 A1* | 10/2015 | Bastani | G02F 1/1309 356/614 |
| 2016/0163271 A1* | 6/2016 | Sakaigawa | G02F 1/133615 345/694 |
| 2017/0140679 A1* | 5/2017 | Tomoda | G09F 9/3026 |
| 2017/0154583 A1* | 6/2017 | de Greef | G02B 26/005 |

FOREIGN PATENT DOCUMENTS

| | | |
|---|---|---|
| JP | 2000089208 A | 3/2000 |
| JP | 2005089643 A | 4/2005 |
| KR | 10-2009-0008928 A | 1/2009 |
| KR | 20120023510 A | 3/2012 |
| KR | 10-2013-0011845 A | 1/2013 |
| KR | 20130037435 A | 4/2013 |
| KR | 20150063773 A | 6/2015 |

* cited by examiner

| Bulletin Sized Billboard approximately 14' x 48' |||||
|---|---|---|---|
| | Present Technology with Existing Front Lighting | Present Technology with Backlighting | Typical LED |
| Pixel Pitch (mm) | 16 | 16 | 16 |
| Weight (kg) | 454 | 757 | 3462 |
| Power (W) | 38 | 2691 | 29,966 |
| Luminance (nits) | 500 (at night) | 500 (at night) | 7000 |
| ~Cost | $11,351 | $14,162 | $154,000 |

HIGHLY REFLECTIVE ELECTROSTATIC SHUTTER DISPLAY

BACKGROUND OF THE INVENTION

The present invention relates to digital signage of all types, especially large area outdoor signage such as billboards, so-called street furniture, signs for advertising and public information, and traffic signs. Preferred embodiments relate to programmable signs which are highly visible especially outdoors where the sun can reduce the visibility of typical electronic displays.

Digital signage typically used outdoors, sometimes referred to as Digital Out Of Home (DOOH) advertising, is growing and becoming a significant application for electronic displays. Although DOOH indoor use can be readily served by hardened consumer display products, outdoor use has more stringent requirements because of the rugged environment and particularly because of legibility requirements in direct sunlight. On a clear day, the sun can provide as much as 30,000 nits impinging on a display screen. The only light emitting display that can provide appropriate contrast in this environment is the LED which typically requires 6500-7000 nits luminance for legibility. The only viable technology for digital billboards, LED, must be run very bright, consuming energy, and is also very heavy and expensive. Thus, the penalty for the use of LEDs is substantial power consumption, significant weight and high cost, but LEDs are the technology of choice, particularly for large displays such as billboards. Non-light emitting reflective or transflective displays are candidates for this application but none has stood out to date. Typical candidates in this category must trade off materials related issues associated with the functionality of the pixel array and its reflectivity.

The present invention expands upon the technology taught in U.S. Pat. No. 5,638,084 (titled Lighting-Independent Color Video display), U.S. Pat. No. 6,692,646 (titled Method of Manufacturing a Light Modulating Capacitor Array and Product), U.S. Pat. No. 6,897,786 (titled Passively Illuminated, Eye-Catching Display for Traffic Signs), and U.S. Pat. No. 7,705,826 (titled Flexible Video Displays and Their Manufacture), the disclosures of which are hereby incorporated herein by reference, to create a highly energy efficient, light weight, low cost display technology that may be tiled to create very large area digital displays such as used in billboards.

SUMMARY OF THE INVENTION

A first aspect of the present invention is a reflective display tile for use in connection with a static or video display including a transparent substrate having a front surface, a rear surface, and a peripheral edge surrounding the front and rear surfaces, an electrostatic shutter array disposed at the front surface of said substrate, a reflective medium disposed at the rear surface of the substrate, and drive electronics disposed rearward of the reflective medium, wherein the shutter array and drive electronics are configured so that the tile can be abutted at any of its peripheral edges against identical tiles to form a display with substantially no perceived optical interface between adjacent tiles.

In other embodiments according to this first aspect, each shutter in the shutter array may be a polymer rollout with ink or blackening material for contrast. The drive electronics may be multiplexed with conventional or thin film transistors. The drive electronics may be direct drive. The reflective medium may include a multi-color pattern. The reflective medium may be a retroreflector. The shutters of the shutter array may be arranged in a grid having rows and columns, adjacent rows each being separated by a first distance and adjacent columns each being separated by a second distance, the rows closest to the peripheral edge each being separated from the peripheral edge by half of the first distance, and the columns closest to the peripheral edge each being separated from the peripheral edge by half of the second distance. The drive electronics may connect with the shutter array through vias in the substrate.

The reflective display tile may be frameless. The reflective display tile may further include a planar light source disposed between the reflective medium and the drive electronics. The reflective medium may be translucent to allow a portion of light from the planar light source to pass through the reflective medium. The planar light source may include fluorescent lamps or light emitting diode lamps.

A static or video display may include a plurality of the reflective display tiles each according to the above description and arranged to form the display, wherein the spacing among the shutters of a single display tile is consistent and is substantially identical to the spacing among shutters across a boundary between abutted display tiles. The reflective display tiles of the plurality may be arranged horizontally and vertically in a planar configuration. The shutters of the shutter array of each reflective display tile may be arranged in a grid having rows and columns, adjacent rows each separated by a first distance and adjacent columns each separated by a second distance, and adjacent reflective display tiles may be abutted at their respective peripheral edges, the closest rows of adjacent reflective display tiles are each separated by the first distance, and the closest columns of adjacent reflective display tiles are each separated by the second distance. A billboard sized display may include the display according to the above description installed to cover a preexisting billboard.

A static or video display may include a plurality of the reflective display tiles each according to the above description and arranged to form the display, wherein the spacing among all of the shutters of the plurality of reflective display tiles is uniform. The static or video display may further include a cover substrate that covers the entire area of the display. The cover substrate may be made of polymer or glass. A billboard sized display may include the display according to the above description installed to cover a preexisting billboard or installed into a new billboard or sign.

A second aspect of the present invention is a reflective display tile for use in connection with a static or video display including an opaque substrate having a front surface, a rear surface, and a peripheral edge surrounding the front and rear surfaces, a reflective medium disposed at the front surface of the substrate, an electrostatic shutter array disposed on the reflective medium, and drive electronics disposed at the front or rear surface of the substrate.

In other embodiments according to this second aspect, the shutter array and drive electronics may be configured so that the tile can be abutted at any of its peripheral edges against identical tiles to form a display with substantially no perceived optical interface between adjacent tiles. The substrate may be a circuit board. Each shutter in the shutter array may be a polymer rollout with ink or blackening material for contrast. The drive electronics may be multiplexed with conventional or thin film transistors. The drive electronics may be direct drive. The reflective medium may include a multi-color pattern. The reflective medium may be a retroreflector. The shutters of the shutter array may be arranged in a grid having rows and columns, adjacent rows each separated by a first distance and adjacent columns each separated by a second distance, the rows closest to the peripheral edge each being separated from the peripheral edge by half of the first distance, and the columns closest to the peripheral edge each being separated from the peripheral edge by half of the second distance. The drive electronics may connect with the shutter array through vias in the substrate. The reflective display tile may be frameless.

A static or video display may include a plurality of the reflective display tiles each according to the above description and arranged to form the display, wherein the spacing among the shutters of a single display tile is consistent and is substantially identical to the spacing among shutters across a boundary between abutted display tiles. The reflective display tiles of the plurality may be arranged horizontally and vertically in a planar configuration. The shutters of the shutter array of each reflective display tile may be arranged in a grid having rows and columns, adjacent rows each separated by a first distance and adjacent columns each separated by a second distance, and adjacent reflective display tiles may be abutted at their respective peripheral edges, the closest rows of adjacent reflective display tiles are each separated by the first distance, and the closest columns of adjacent reflective display tiles are each separated by the second distance. A billboard sized display including the display according to the above description may be installed to cover a preexisting billboard.

A static or video display may include a plurality of the reflective display tiles each according to the above description and arranged to form the display, wherein the spacing among all of the shutters of the plurality of reflective display tiles is uniform. The static or video display may further include a cover substrate that covers the entire area of the display. The cover substrate may be made of polymer or glass. A billboard sized display including the display according to the above description may be installed to cover a preexisting billboard or installed into a new billboard or sign.

A third aspect of the present invention is a reflective display tile for use in connection with a static or video display including a substrate having a front surface, a rear surface, and a peripheral edge surrounding the front and rear surfaces, a conductive pattern on the front surface of the substrate, a dielectric layer on the conductive pattern, a polymeric film attached to the dielectric layer, the polymeric film coated on one side with a conductive metal or transparent film and on another side with ink or blackening material, the polymeric film cut into flaps that form shutters, and drive electronics to excite each shutter.

In other embodiments according to this third aspect, the shutters and drive electronics may be configured so that the tile can be abutted at any of its peripheral edges against identical tiles to form a display with substantially no perceived optical interface between adjacent tiles. The substrate may be transparent or may be opaque, in which case it may be a circuit board. The drive electronics may be multiplexed with conventional or thin film transistors. The drive electronics may be direct drive. A reflective medium may be disposed on the front surface or the rear surface of the substrate and may include a multi-color pattern. A reflective medium may be disposed on the front surface or the rear surface of the substrate, the reflective medium being a retroreflector. The shutters of the shutter array may be arranged in a grid having rows and columns, adjacent rows each being separated by a first distance and adjacent columns each being separated by a second distance, the rows closest to the peripheral edge each being separated from the peripheral edge by half of the first distance, and the columns closest to the peripheral edge each being separated from the peripheral edge by half of the second distance. The drive electronics may connect with the shutter array through vias in the substrate. The reflective display tile may be frameless.

A static or video display may include a plurality of the reflective display tiles each according to the above description and arranged to form the display, wherein the spacing among the shutters of a single display tile is consistent and is substantially identical to the spacing among shutters across a boundary between abutted display tiles. The reflective display tiles of the plurality may be arranged horizontally and vertically in a planar configuration. The shutters of the shutter array of each reflective display tile may be arranged in a grid having rows and columns, adjacent rows each separated by a first distance and adjacent columns each separated by a second distance, and adjacent reflective display tiles may be abutted at their respective peripheral edges, the closest rows of adjacent reflective display tiles each being separated by the first distance, and the closest columns of adjacent reflective display tiles each being separated by the second distance. A billboard sized display may include the display according to the above description installed to cover a preexisting billboard.

A static or video display may include a plurality of the reflective display tiles each according to the above description and arranged to form the display, wherein the spacing among all of the shutters of the plurality of reflective display tiles is uniform. The static or video display may further include a cover substrate that covers the entire area of the display. The cover substrate may be made of polymer or glass. A billboard sized display may include the display according to the above description installed to cover a preexisting billboard or installed into a new billboard or sign.

DETAILED DESCRIPTION

The technology described herein relates to a very low cost, low power, simple electronic shutter array and independent reflector, which allows independent optimization of each. In the electronic shutter array, the shutters are miniature electromechanical light valves made of very thin metallized polymer foil. The shutter array may be constructed on a highly transparent substrate and can be overlaid on any reflective medium that can be chosen for its optical properties such as reflectance, color, viewing angle, etc. Together, the shutter array and the reflective medium form a pixel array. Examples of such a medium might be a retroreflector panel or a color filter printed on a high contrast substrate. Alternatively, the shutter array may be constructed on an opaque substrate that has a reflective medium on the surface in contact with the shutter array. Thus, this technology completely separates the functionality of the shutters in the shutter array and the reflective medium. Because of its high degree of reflectivity, low power and light weight, it can be installed on most existing billboard installations utilizing the existing illumination and infrastructure. Life tests of millions of open/close cycles have been run. This array has approximately an order of magnitude less weight, power consumption and cost than a comparably sized LED array. This technology, when productized, can significantly expand the use of outdoor (and indoor) signage for consumer, social and advertising information.

Figures 1, 2:
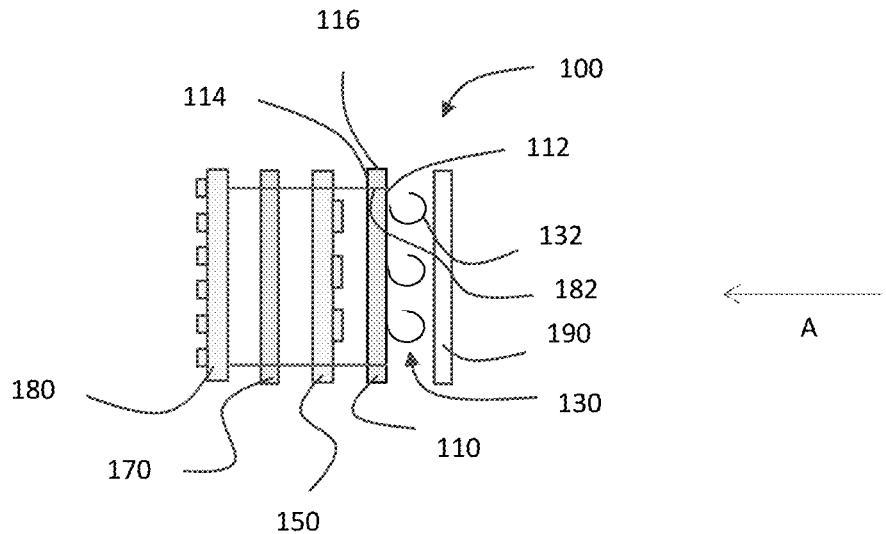
FIG. 1 is an exploded side view of a frameless reflective display tile in accordance with one embodiment of the present invention.
FIG. 2 is a table listing key features of the present technology compared to those of a typical LED based bulletin sized billboard.

As shown in FIG. 1, a first embodiment of the present invention is a frameless reflective display tile 100 that can be used for static or video display. Tile 100 primarily includes a substrate 110, an electrostatic shutter array 130, a reflective medium 150, and drive electronics 180. An exploded side view of tile 100 is shown in FIG. 1 where a viewer would see the tile from a direction of right-to-left on the page. FIG. 2 is a table listing the technology's key features compared to those of a typical LED based bulletin sized billboard.

Substrate 110 is a substantially transparent sheet made for example, of glass or plastic. Substrate 110 has a front surface 112, a rear surface 114, and an edge at its periphery 116 that surrounds front and rear surfaces 112, 114. Transparent substrate 110 is equipped with electrostatic shutter array 130 of many electromechanical shutters 132 disposed at its front surface 112. That is, shutter array 130 is disposed frontward of substrate 110 in the direction of how tile 100 is viewed, with shutter array 130 being seen first, then substrate, then elements rearward of substrate. Each shutter 132 comprises a thin, coated polymer film that is coiled in its unexcited state, allowing light to pass through the shutter opening, and extended in its excited state, blocking light from passing through the shutter opening. Thus, shutter array 130 can be configured to be fully light blocking and in another configuration essentially fully transmissive.

A glass or plastic substrate 110 of chosen size has a transparent conductive layer on front surface 112. The size is chosen as a design issue to enable convenient assembly of many such tiles into a larger display. Typical size may range from a few inches on a side to a few feet, and the shape of the tiles can be square, rectangular, or other shapes suitable for tiling without gaps between adjacent tiles. The transparent conductive layer may be material such as indium tin oxide (ITO) that has been sputtered on the substrate by well-known means and then patterned by well-known means into a connection matrix for the shutters. A thin transparent dielectric layer is then placed over the conductive layer. The layer may be a sputtered dielectric or it may be a dielectric film that has been adhered to the substrate by means of a pressure sensitive adhesive or other well-known means. The shutter array 130 is then placed on the dielectric layer by means taught in the prior art. Typical construction consists of placing many narrow adhesive lines on the dielectric followed with a film of the shutter material such as PEN which is adhered to the lines of adhesive. Adherence can be done with commercial options not requiring adhesive, as well. Shutter flaps are then cut into the PEN typically by means of laser ablation and the flaps are then made to curl to form the shutters 132 through a thermal process.

The positioning of shutter array 130 at front surface 112 can be a direct attachment on front surface 112 or can be an attachment to one or more layers that are provided on front surface 112 such as coatings, dielectric layers, conductive layers, etc., as described above. Each shutter 132 in shutter array 130 is a polymer rollout More specifically, the thin polymer foil comprising the shutter array 130 is cut into flaps and heat treated so that the flaps roll up into tight retracted coils, exposing a shutter opening and the underlying reflective material. The retracted shutter occupies approximately 10% of the area that the shutter would occupy if extended. A voltage applied to a shutter will cause it to uncoil, extending it to fully block the light at the shutter opening. The shutter retracts upon removal of the voltage. Because of this construction, the shutters provide nearly 100% blockage when closed and about 90% transmission when open. The array is readily fabricated in any size on a thin glass or plastic substrate or, alternatively and as discussed below, on an opaque substrate such as a typical printed circuit board (PCB) used to house the drive electronics 180.

Reflective display tile 100 further includes reflective medium 150 as a highly reflecting surface disposed at rear surface 114 of substrate 110. This surface reflects light that is passed through the pixel opening in its unexcited or rolled up state. The reflective surface may be white or any single color thereby creating a monochrome display or may have a multi-color pattern on it creating red, blue, and green reflecting areas corresponding to the openings created when the pixels are extended. Thus a multi-color display may be created. The reflecting surface may also have a structural pattern such as in a retroflector, causing impingent light to be reflected back to the light source such as is used in traffic signs where light from a vehicle's headlight is reflected back to the vehicle driver. The positioning of reflective medium 150 can be one of direct attachment to substrate 110 or can be adjacent to rear surface 114 with one or more other elements located between reflective medium 150 and substrate 110. It may alternatively be positioned on front surface 112.

Drive electronics 180 to excite the shutters is mounted behind or rearward of reflective medium 150 such that they are on the side of reflective medium 150 opposite of substrate 110. To be clear, the rearward position is referenced in the context of the direction along which tile 100 is viewed, which is shown in FIG. 1 by arrow "A". Drive electronics 180 are comprised of a circuit board, standard integrated circuits, and other electronic components that will extend and retract the shutters in a predetermined pattern to create the desired picture on the display surface. Drive electronics 180 can be direct drive, or can be XY multiplexed with conventional or thin film transistors. Drive electronics 180 provide electrical contact to the shutters of the shutter array 130 through vias 182 in substrate 110, which enables and facilitates tiling of multiple reflective display tiles 100 without needing space between adjacent tiles to accommodate electronics or other components that enable the functionality of tile 100.

The shutter array 130 is positioned on substrate 110 so that the last shutter 132 (i.e., the one nearest the perimeter in its row or column) is spaced from the edge or perimeter 116 of substrate 110 by a value of one half of the spacing between other shutters. In this way, when two substrates are abutted together, either horizontally or vertically, the shutter spacing across the boundary between the first and second substrates is substantially identical to that of the shutter spacing across each individual substrate. It is preferable that the value of the distance between shutters on adjacent tiles is within, and preferably less than, about ten percent, and in some cases as low as one percent, of the value of spacing of shutters within a single tile, though other values are also acceptable as long as the array of shutters among a plurality of tiles appears uniform and seamless to a viewer. In addition, the drive circuitry behind substrate 110 is designed to make contact to the shutter array through vias 182 in the substrate or otherwise so that the drive circuitry does not interfere with the regularity of the reflective pattern of the shutters. Thus, each individual display tile, consisting of the shutter array, reflector and drive circuitry may be abutted next to each other, creating a display of any arbitrary size.

The electrical contacts to the individual shutters in the shutter array may be made in at least two different ways. In one way, direct contact (direct drive) to the individual shutters may be made. The transparent conductive layer on the substrate is patterned into fine conductive lines that connect to the shutters. These are the electrical contacts to electronically control each shutter. In a second way, the shutters are multiplexed. In this configuration, the transparent conductive layer on the substrate is patterned into parallel wires, typically in a vertical pattern and the metallized PEN is patterned into parallel wires, typically horizontally while the shutters are patterned. Since the shutters have a hysteretic response to voltage, they may then be multiplexed with simply XY addressing, typically referred to as passive matrix addressing. In a possible situation where the shutters don't respond well to passive matrix addressing, active matrix addressing using thin film transistors or other nonlinear elements may be used.

Figure 4:
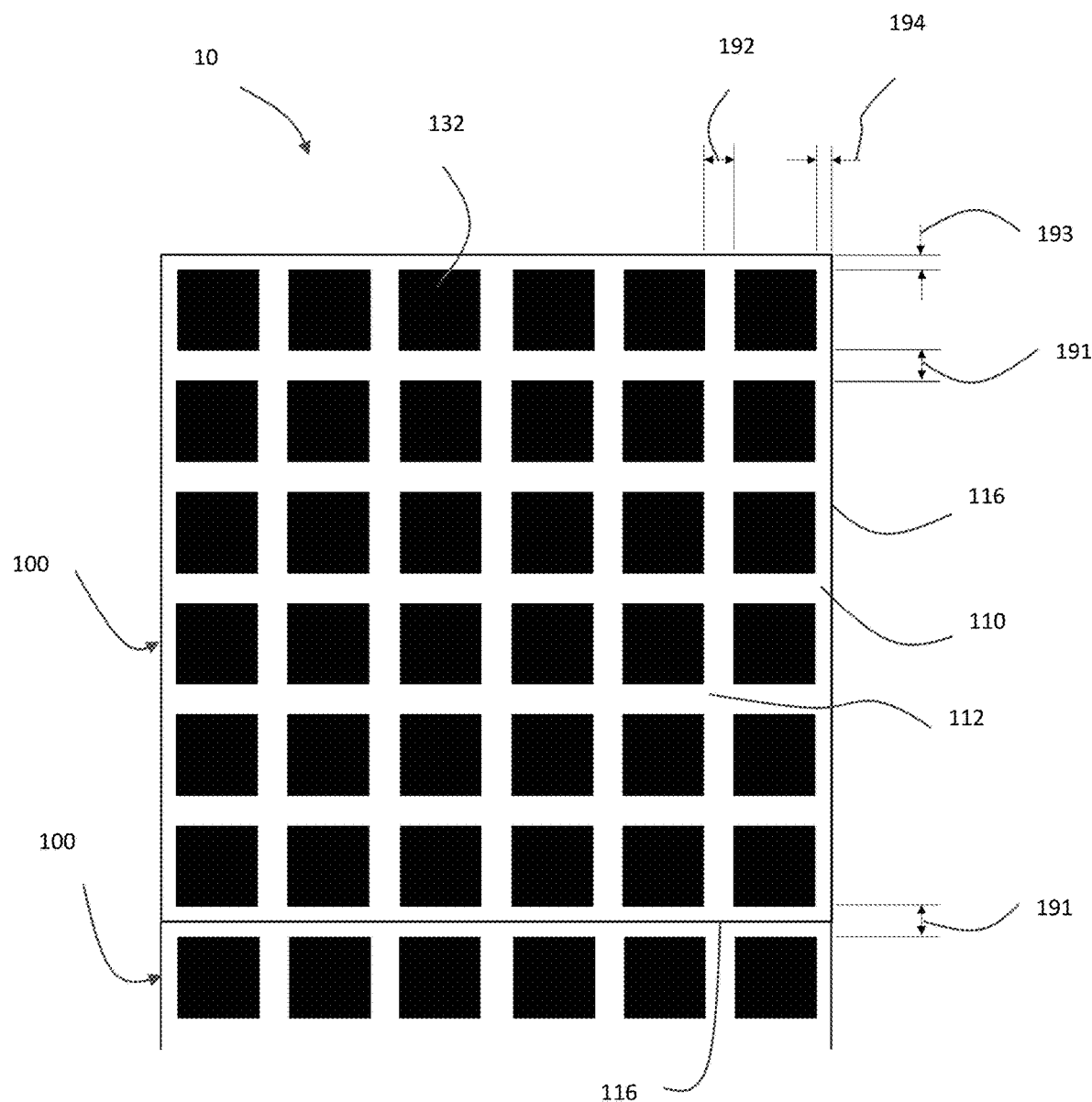
FIG. 4 is a plan view of a full display tile of the present invention adjacent to the top portion of a second tile.

With reference to FIG. 4, a full tile 100 is shown adjacent to the top portion of a second tile 100 that abuts the lower edge of the full tile 100. Shutters 132 are arranged in a grid pattern having multiple rows and columns within each tile 100. Adjacent rows are each separated by a first distance 191. Likewise, adjacent columns are each separated by a second distance 192. The rows closest to peripheral edge 116 are each separated from peripheral edge 116 by a value 193 that is equal to half of the first distance, and the columns closest to peripheral edge 116 are each separated from peripheral edge 116 by a value 194 that is equal to half of the second distance. In this way, the lowermost row of shutters 132 of the full tile 100 is spaced from the uppermost row of shutters 132 of the partially shown tile 100 by the same first distance 191, which makes each tile 100 effectively frameless.

A static or video display 10 includes a plurality of reflective display tiles 100 arranged horizontally and vertically in a planar configuration to form the display. The spacing among shutters 132 of a single display tile 100 is consistent and is substantially identical to the spacing among shutters 132 across a boundary between abutted display tiles, as described above. As evidenced by FIG. 4, where the elements are displayed for explanatory purposes and not necessarily to scale, shutters 132 are arranged in this way to cause the tiled display 10 to appear generally as one seamless display to a viewer despite the fact that is it made of a plurality of discreet, frameless tiles 100. A billboard sized display can include static or video display 10 installed to cover a preexisting billboard or installed into a new billboard or sign. When installed to cover a preexisting billboard, display 10 can be installed using the existing billboard infrastructure since it has applicability of existing front lighting. Display 10 can also include a cover substrate 190 that covers the entire area of display 10 to protect shutters 132. Cover substrate 190 fits the entire display 10 in lieu of individual cover substrates over each pixel of display 10. In this way, cover substrate 190 does not create any unnecessary edges in the appearance of display 10 at each pixel. The cover substrate 190 is a sheet that can be made of plastic, other polymers, or glass.

Display tile 100 is tilable in that identical tiles 100 can be abutted at their peripheral edges 116 with substantially no perceived optical interface between adjacent tiles. In other words, display tile 100 can be abutted at any of its peripheral edges (top, bottom, left side, right side) against identical tiles (at a peripheral edge thereof) to form a display with substantially no perceived optical interface between adjacent tiles. In this way, the overall display appears to be seamless such that it is not apparent that it is made up of individual tiles 100.

The human eye can resolve an angle of about one arc-minute. Since the typical angular resolution of the human eye is one arc-minute, given a pixel size of 12 mm by 12 mm with a pixel spacing of 2 mm, the spacing would not be visually detectable by the human eye at distances greater than about 6.6 meters. Of course other sizes of pixels can be used in accordance with the present invention. That is, when viewed from a distance of about 6.6 meters, a viewer will not readily perceive any frame or border of any of the tiles. The configurations of shutter array 130 and the drive electronics 180 described above facilitate this tilability. In that way, when adjacent reflective display tiles 100 are abutted at their respective peripheral edges 116, the closest rows of adjacent reflective display tiles 100 are each separated by the first distance 191, and the closest columns of adjacent reflective display tiles are each separated by the second distance 192. This is shown in FIG. 4, where the distance separating the closest rows of adjacent reflective display tiles 100 is labeled as 191, the same as the distance between adjacent rows of the same reflective display tile 100. In this way, the spacing among all of the shutters 132 of the plurality of reflective display tiles 100 is uniform.

According to another aspect of the present invention, a tile can include a thin planar light source 170 disposed behind or rearward of reflective medium 150 and in front of the drive electronics 180 thus creating a self-illuminated display tile. With the optional use of this light source 170, reflective medium 150 is designed so that it is translucent enough to allow a sufficient amount of the light from this planar light source 170 to pass through reflective medium 150 so that the display may be seen in a relatively dark environment. The planar light source 170 may be very energy efficient, comprised of thin fluorescent lamps or light emitting diode lamps or any efficient source of light. The presently disclosed display tiles can therefore include any backlight or even optional front lighting from an existing billboard.

Figure 3:
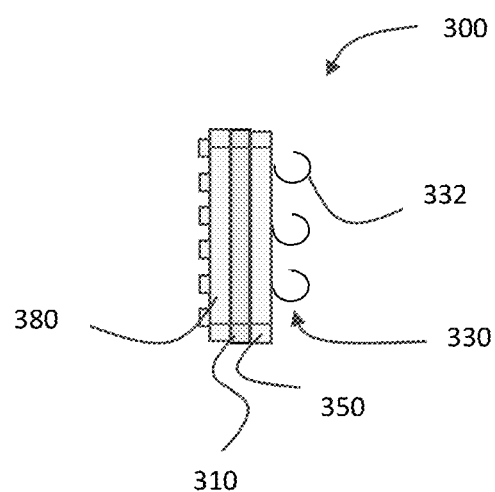
FIG. 3 is a side view of a frameless reflective display tile in accordance with another embodiment of the present invention.

A second embodiment of the present invention is a similar reflective display tile 300 shown in FIG. 3, where like elements are numbered similarly to display tile 100. Display tile 300 substitutes an opaque substrate 310 for the substantially transparent substrate 110 of display tile 100. In this embodiment, reflective medium 350 is disposed on the front surface of substrate 310 and can include a multicolor pattern on the surface facing shutter array 330, which is disposed on reflective medium 350. That is, shutter array 330 is placed on one surface of a typical opaque circuit board as substrate 310 that has been coated with reflective medium 350. The other side or rear surface of the circuit board 310 contains drive electronics 380. Alternatively, drive electronics 380 can be located on the front surface of circuit board 310 or can be rerouted on the rear surface of the substrate as the reflecting surface is rerouted on the front surface of the substrate. Alternatively, drive electronics 380 could be located in another aspect of tile 300 such that it is hidden from a viewer's sight lines when the front surface is being viewed and such that it facilitates tiling of tile 300. In this configuration, display tile 300 is not transmissive and does not include a backlight. Display tile 300 reflects sunlight during the daylight hours and front surface lighting during dark hours. These display tiles 310 may be installed on an existing traditional billboard or sign which has typically been equipped with front surface lighting. In this general configuration, drive electronics 380 may comprise traditional electronic components or thin film transistors. In that case, the thin film transistors may be on the front or rear of the substrate.

In a variation of the embodiments of display tiles 100 and 300, the substrate includes a conductive pattern on the front surface thereof. A dielectric layer is on the conductive pattern. A polymeric film is attached to the dielectric layer, for example via an adhesive line pattern on the dielectric layer. Other methods of bonding the polymeric film to the dielectric layer, such as welding or heat bonding, may not utilize an adhesive. The polymeric film, which is coated on one side with a metal film or a transparent conductive film and on another side with ink, is cut into flaps that form shutters. Use of ink as a coating on the polymeric film provides an improvement over prior art devices. Therefore, each shutter in the shutter array is a polymer rollout with ink or blackening material for contrast. Drive electronics are provided that excite each shutter.

Since a major application for these displays is for large area signage and billboards, it is a practical consideration to tile many display tiles 100 or 300 side by side to result in large displays 10 that are impractical to produce on one substrate because of size. A key objective of a tiled display is making it appear to be one large display panel to the observer. Liquid crystal video walls suffer in that regard in that they typically have relatively wide mullions that visibly separate the individual display panels that comprise the tiled display. These black-line visual separations between panels are generally considered to visually degrade the appearance of the video wall.

Although large area LED displays such as billboards do not incorporate physical mullions as do liquid crystal video walls, they do suffer from visual artifacts which enable observers to see the individual tiles and tile boundaries, detracting from their appearance. Two key artifacts include tile edge differences which allow observers to see the tile boundaries as thin outlines around each tile. Also, neighboring tiles may have different average brightness, allowing observers to "see" the individual tiles. It is very difficult to minimize this artifact because LED brightness is very sensitive to drive conditions and the LED properties drift over time. A new tiled LED billboard may initially have visibly indistinguishable tiles but after some time the individual tiles will be distinguishable due to slight differences in average tile brightness.

The present technology provides display tiles that are constructed with a spacing of X between shutters in the horizontal direction and a spacing of Y between tiles in the vertical direction as seen in FIG. 4. The last shutter on the horizontal edge of the tile is constructed so that the spacing between the shutter and the tile edge is one-half X and the last shutter on the vertical edge of the tile is constructed so that the spacing between the shutter and the tile edge is one-half Y. When these tiles are abutted together on either edge the perceived shutter spacing across tiles is X and Y respectively. Whether the tiles are produced on a transparent or opaque substrate, light transmission or reflection at the interfaces is minimized, thereby minimizing visibility of the interfaces. The reflecting medium behind the shutters is printed and permanent and not electronic. Therefore it is not impacted by changes in drive signal or changes in electrical properties. As an option, the reflecting media for each tile in a large tiled display may be produced from the same batch, therefore assuring the same reflectivity and lack of apparent differences across tiles.

Since the reflective medium is separate and distinct from the display functionality, it may be optimized with little or no constraints. For black and white displays, it is chosen to be the whitest white ($\geq$97% reflectivity). This may be chosen from a range of available white surfaces such as $TiO_2$ or $BaSO_4$ coated surfaces, ultra-white papers and plastics and Spectralon™. If the display is being used as a traffic sign, a retroreflector may be used.

If a color display is needed, the reflecting medium may be coated with the primary red-blue-green color pattern corresponding to the shutters in the shutter array. By selecting which shutters are blocking or open, primary colors or combinations thereof may be chosen. Colored pigmented or dye based ink or color penetrating media may be used to create the colors on the reflecting medium. The number of color choices is dependent upon the number of available grey levels.

There are three separate mechanisms or combinations thereof that determine the number of grey levels. One mechanism is by geometric color mixing. In this case an individual pixel may be composed of many subs-pixels. For example, in a billboard display with an array of 12 mm square pixels, each pixel may be composed of 2 mm square pixels, for a total of 36 subpixels. If 12 subpixels are red, 12 green and 12 blue there will be 2197 perceptible color choices, since at the billboard viewing distance the subpixels are not discernable from the whole pixel. A second mechanism for creating grey scales is to partially open subpixels. A third mechanism is through pulse width modulation (PWM). If the subpixels each have 2 open states, half and fully open, and are run at three different speeds, one-third speed, two-thirds speed and full speed, the number of colors increases to 389,017. Although LED based billboards advertise many millions of colors, well less than 389,017 would be distinguishable to the naked eye.

Contrast is a key factor that determines the legibility of the display in reflected light. Any portion of light that is reflected off any surface of the display that is not an intended viewable pixel will reduce contrast. It is therefore important that surfaces that are not pixels be made to be non-reflective. This may be done by making all such surfaces black. There are two key surfaces to consider. One is surface on the reflecting medium that comprises the multicolor pattern, which may be considered to function as a "color filter". Because of possible slight misalignment of the shutters and the color pattern, a black matrix is placed around the color portions of the pattern that correspond to openings in the shutters. A second surface that may detract from contrast is the electrostatic shutter itself. Since it may be a metallized possibly transparent polymer, the reflective metal surface may be seen through the polymer. When sunlight or other lighting is impingent on the display surface, the metal layer will reflect some of this lighting which will detract from the display contrast. The non-metallized side of the polymer may therefore be coated with black ink or other color ink or blackening material to reduce these reflections and increase contrast. If the polymer is not metalized, contrast would still be enhanced with blackening material on the polymer. More information in this regard is provided in U.S. Pat. No. 8,736,938 (titled Electronically Controlled Insulated Glazing Unit Providing Energy Savings and Privacy), the disclosure of which is hereby incorporated herein by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A reflective display tile for use in connection with a static or video display comprising:
   a single opaque substrate having a front surface, a rear surface, a peripheral edge surrounding the front and rear surfaces, drive electronics mounted on the rear surface of the opaque substrate, and a conductive layer on the front surface of the opaque substrate;
   a reflective medium separate and distinct from the opaque substrate and coated on the opaque substrate;
   an electrostatic shutter array comprised of a polymer film divided into individual shutters, wherein the polymer film is disposed on the reflective medium that is coated on the opaque substrate; and
   a cover protective substrate that covers the entire area of the display tile;
   wherein a voltage applied to a shutter of the shutter array will cause the shutter to uncoil, extending the shutter to fully block the light at the shutter opening, and
   wherein the reflective display tile includes the single opaque substrate as the only substrate between the reflective medium and the drive electronics.

2. The reflective display tile of claim 1, wherein the display tile is not transmissive and does not include a backlight.

3. The reflective display tile of claim 1, wherein the drive electronics is multiplexed with conventional or thin film transistors.

4. The reflective display tile of claim 1, wherein the drive electronics is direct drive.

5. The reflective display tile of claim 1, wherein the shutters of the shutter array are arranged in a grid having rows and columns, adjacent rows each separated by a first distance and adjacent columns each separated by a second distance, the rows closest to the peripheral edge are each separated from the peripheral edge by half of the first distance, and the columns closest to the peripheral edge are each separated from the peripheral edge by half of the second distance.

6. The reflective display tile of claim 1, wherein the drive electronics connects with the shutter array through vias in the opaque substrate.

7. The reflective display tile of claim 1, wherein the shutter array and drive electronics are configured so that the tile can be abutted at any of its peripheral edges against identical tiles to form a display with substantially no perceived optical interface between adjacent tiles.

8. The reflective display tile of claim 1, wherein the opaque substrate is a circuit board.

9. The reflective display tile of claim 1, wherein each shutter in the shutter array is a polymer rollout with ink or blackening material for contrast.

10. The reflective display tile of claim 1, wherein the reflective medium comprises a multi-color pattern.

11. The reflective display tile of claim 1, wherein the reflective medium is a retroreflector.

12. A large static or video display comprising:
    a plurality of the reflective display tiles each according to claim 1 and arranged to form the display,
    wherein the spacing among the shutters of a single display tile is consistent and is substantially identical to the spacing among shutters across a boundary between abutted display tiles.

13. The large static or video display of claim 12, further comprising front surface lighting.

14. The reflective display tile of claim 1, wherein the cover protective substrate is made of polymer or glass.

15. The reflective display tile of claim 1, wherein the reflective medium includes a $TiO_2$ or $BaSO_4$ coated surface or is comprised of ultra-white plastic.

16. The reflective display tile of claim 1, wherein at least 97% of light reflects off the reflective medium.

17. A reflective display tile for use in connection with a static or video display comprising:
    a single opaque substrate having a front surface, a rear surface, a peripheral edge surrounding the front and rear surfaces, drive electronics mounted on the rear surface of the opaque substrate, and a conductive layer on the front surface of the opaque substrate;
    a reflective medium separate and distinct from the opaque substrate and coated on the opaque substrate;
    an electrostatic shutter array comprised of a polymer film divided into individual shutters, wherein the polymer film is disposed on the reflective medium that is coated on the opaque substrate; and
    a cover protective substrate that covers the entire area of the display tile;
    wherein a voltage applied to a shutter of the shutter array will cause the shutter to uncoil, extending the shutter to fully block the light at the shutter opening,
    wherein the reflective display tile includes the single opaque substrate as the only substrate on which the reflective medium and the shutter array are disposed.

* * * * *